Patented Feb. 10, 1942

2,272,990

UNITED STATES PATENT OFFICE 2,272,990

FRUIT PRODUCT AND METHOD

Jesse Clayton Forkner and John H. Forkner, Fresno, Calif.

No Drawing. Application October 18, 1941, Serial No. 415,636

19 Claims. (Cl. 99—125)

Our invention relates to the provision of an improved fruit product. It is concerned more particularly with the provision of a fruit paste, filler, or pellet made from a selected edible fruit and a carrying vehicle prepared from the fibrous meat of nuts preferably of the palm group such as coconuts, babassu nuts, and palm kernals, which acts as a stabilizer and provides improved results not heretofore available. We could also use nut fibres obtained from the low fibre content group as exemplified by Brazil or walnut.

This application is a continuation in part of our copending application Serial No. 367,764, filed November 29, 1940, for "Food product and method."

An object of our invention is to provide a fruit paste which can be mechanically formed into pellets, and having a capacity for further moisture absorption.

Another object of the invention is to provide a fruit paste or fruit and sugar paste of the character referred to which may expand upon baking in a dough product and which will solidify or set in its expanded condition without apparent subsequent contraction.

Another object of our invention is to provide a fruit paste which has a materially greater moisture absorption capacity than the fruit ingredient without becoming semi-liquid or mushy.

Another object of our invention is to provide a fruit cube or filling which has a uniform and homogeneous expansion and is not subject to cracking when baked in dough or thereafter.

Another object of our invention is to provide a comminuted fruit product of a non-viscous nature which does not break down nor pull out of the dough of bakery products when cut.

Another object is to provide a fruit paste of the character referred to which will not rapidly lose appreciable moisture to the surrounding dough either during or after baking and which apparently maintains a uniform moisture content.

Another object of our invention is to provide an exiguous fruit paste product of the character referred to which is adapted for use in bakery goods such as fruit cake and which will retain the same approximate density as the surrounding baked dough.

Another object of our invention is to provide a dried fruit product with a stabilizer or carrier which blends into the fruit so as to lose the identity of the stabilizer and to acquire and assimilate the principal characteristics of the desired fruit in appearance, taste, odor, and color.

Another object of our invention is to implant a white nut fibre base in dried fruit that intensifies the apparent lightness and brilliance of primal coloring matter that might be added to the fruit.

Another object of our invention is to essentially lessen viscousness of dried laticiferous fruits such as figs so that in comminuted form in a bakery product they do not stick to cutting knives nor do they break down and spread a streak of color across the face of the cut dough product.

Another object of our invention is to provide a dried fruit paste that will not ferment after baking in a bakery product using dried fruit of low natural sugar content such as prunes or apples by fortifying with commercial sugar and stabilizing to prevent mushiness after baking by addition of nut fibre with its oils substantially removed.

We lay particular emphasis on our invention of combining nut fibres and laticiferous dried fruit pastes resulting in a base paste that is new in fruit bakery technique and has many novel features as herein indicated.

Another object of our invention is to provide comminuted fruit particles or pellets derived by cracking which are characterized by smooth even surfaces with sharply defined edges.

Another object of our invention is to provide a powdered or finely comminuted fruit product which will remain in an exiguous form for an indefinite period under varying climatic conditions.

Another object of our invention is to provide for dehydration of dried fruit products at atmospheric pressure to provide a brittle consistency of the product without deleterious change therein.

Other objects and advantages of the invention will be apparent from the following description of a preferred form of the product and a preferred method of producing such product.

Known commercial stabilizers fall generally into three groups. We believe none of these provides a suitable carrying vehicle for fruit or fruit and sugar in exiguous form for use in bakery goods as conceived herein. Pectin and certain gum types of stabilizers will provide a very heavy gum-like base apparently suitable, but which should be brought to a boil before they will absorb adequate amounts of water.

Used in bakery products as herein described, the fruit is rarely if ever brought to a boiling point, so that this type of stabilizer during baking does not achieve sufficient water holding and retention capacities. Actually these stabilizers will lose considerable moisture in baking and will break down and cause a soggy, doughy mass of dough surrounding them.

Other stabilizers, for instance the agar and gelatin group do not require boiling for moisture-carrying properties, but these forms of stabilizers do not provide a heavy fibrous base of the same consistency as heavy jams and ground dried fruit paste. Both the above groups are jelly-like in consistency and thus do not provide a suitable consistency in conjunction with fruit when baked, and they also all have the disadvantage last named in the preceding paragraph.

A third potential fruit filler and stabilizer is the cereal group which is best exemplified by flour or starch, and in all cases this group is not suitable for use in necessary amounts in conjunction with fruit for bakery use because, in contrast to fruits, they bake and crack under heat and undergo a change in texture, they do not retain an individual primal color base, and they impart a foreign taste to the product.

Other forms of vegetable flours mixed in fruit, best exemplified by potato and soy bean flour and tapioca, do not provide adequate fibre to supply a stable cellular structure; they do not reabsorb adequate moisture after baking, usually have flavor; they tend to bake; they crack and do not adequately carry primal colors.

Our invention comprises a new fruit stabilizer and filler for bakery products which eliminates all of the above-described difficulties heretofore common with the use of fillers with fruits. Particularly, it does not bake at oven temperatures; it does not require boiling to provide it with its moisture absorption capacity; it does not break down rapidly or contract either during or after baking. It will absorb free moisture in the fruit or surrounding the cube in the baked dough mass usually caused by the condensation of steam. It is not sticky, viscous, gelatinous, nor glutinous, and it is insoluble.

Our invention contemplates the use of the fibrous meat of nuts, and particularly coconut, when prepared and treated as herein described and which is available in various raw forms. Attempts have been made and desires expressed to use this meal as a food product for human consumption for many years, but no widespread use of the meal has resulted from such attempts.

In accordance with the instant invention, a meal or fibre such as that of coconut is prepared for use as a stabilizer, a primal color base and as a carrying agent for a desired edible fruit product of the character commonly employed in the bakery trade. In this use advantage is taken of the desirable individual cellular structure and insoluble character of the fibre.

In describing the invention, reference will be had to a coconut product which is the preferred ingredient, but it is understood that the invention is useful with other nut fibres.

Our invention does not necessarily involve a new manufacture of nut fibres but promulgates a process and resultant product which is a hitherto unprovided technological deviation from established dried fruit and bakery practice. The fibre we use can be simply made in a number of already established methods. We may or may not wish to wash out the flavor and in the event that we do, any simple washing and drying method is generally found suitable. We recognize a number of reputedly improved processes of manufacturing meal, but these in no way anticipate nor infringe on our process or product except by the vaguest interpretation. We prefer to make our product by expressing a portion of the oil from common desiccated coconut and thereafter washing out the flavor from the meal with the water and redrying. We can also use expeller meals suitable refined and bleached by common bleaching agents; we can also use meal made by extraction of oil by solvents, hydraulic pressing or common boiling.

For example, we may take 100 lbs. of commercial desiccated coconut of a fine consistency and place it with 900 lbs. of boiling water in a suitable agitator where washing, draining, and rewashing with agitation is carried out for about one hour. Subsequently, the entire drained mass is placed in a suitable hydraulic press to press out the major portion of the liquid constituents. The press being stopped at say 2,000 lbs. pressure per sq. in. and left for about one hour to allow final drainage.

The fibrous material or stabilizer resulting from the above treatment will have an oil content of about 7 to 30 per cent of the original oil content. For usual commercial practice we have found that from ten to thirty per cent oil content of the fibrous material is the most desirable range. In general, the oil content must be sufficiently low that it will not be apparent in the fibrous material, will not turn rancid in the stabilizer or in the final baked product, and will provide increased moisture absorption capacity. The above conditions are fulfilled when the fibrous material has only a minor portion of its original oil content.

The fibrous material is also essentially free of the natural flavors of coconut and is capable of absorbing several times its weight of moisture. Particularly, such fibrous material will absorb an equal weight of moisture while retaining the dry appearance and characteristic commonly associated with desiccated coconut. Further, when finely ground, say to about 20 mesh or finer, this coconut fibre has the property of being assimilated by a fruit agent, such as a dried fruit or a fruit jam, so as to be indistinguishable as coconut in the resulting fruit paste. The coconut fibre tends to lose its identity and to acquire the characteristics of appearance, taste, color, and odor of the fruit with which it is mixed. At the same time, the fibre imparts to the mixture the desired cellular structure and reactions to heat and moisture.

In making the paste it is preferred to use from 5 to 20% by weight of the coconut stabilizer, depending upon the character of fruit product with which it is employed. In any event, the amount used should not be sufficient to cause the resultant fruit paste to lose the characteristic flavor of the fruit with which it is mixed or it is intended to resemble. Also, the amount employed should not be so small as to be of no appreciable value as a moisture absorbent in the resultant product. We have found that about 4 to 12% by weight of the stabilizer is the most suitable proportion for pellets and a larger proportion for other uses is sometimes desirable.

As stated above, the edible fruit products employed may be dried fruit such as prunes, raisins, apricots, peaches, and figs, which should be sterilized by any commonly recognized process. Also the fruit products may include jams and marmalades of the usual type, wherein the fruit is preserved with sugar by cooking and concentrating to the desired consistency. Any type of edible fruit may be employed for the jams and marmalades including berries.

For example, the following formula may be employed for the manufacture of a dried fruit paste suitable to mechanically make cubes or pellets for use in fruit cake or bread.

| | Pounds |
|---|---|
| Coconut stabilizer | 70 |
| Finely ground dried white figs | 250 |
| Orange jam | 75 |
| Powdered sugar | 175 |

Orange flavor, color and salt to suit.

The dried figs in the above example are used as a binder, and other suitable binders may be used, such as other fruits or sugars. In preparing the above paste, the ingredients are all mixed together.

A further example for preparing an apricot paste is

| | Pounds |
|---|---|
| Dried ground apricots | 200 |
| Coconut stabilizer | 20 |
| Total | 220 |

The apricots and stabilizer are mixed to the desired uniformity.

For use with fruit for mechanically made pellets such as dried prunes, the following formula may be followed:

| | Pounds |
|---|---|
| Dried prunes | 200 |
| Coconut stabilizer | 20 |
| Granular sugar | 50 |

In this formula, the sugar is added to eliminate fermentation of the comminuted prunes after baking.

In preparing pastes such as those given above, the coconut stabilizer and the fruit may be milled or ground together or separately and the size of the coconut stabilizer particles may be controlled by the type of grinding operation to about 10 mesh or less in accordance with the desired characteristics of the resulting product.

The paste is then introduced into any pellet forming machine such as a fig pellet machine or a cut and roll confectioner's unit. In this latter equipment the fruit is pressed by a sausage or roller type press through nozzles, cut by wire, and preferably rolled by top and bottom counter agitating belts, usually using flour or starch drying powder.

We prefer to mechanically form our pellets by a fig pellet machine, common to the dried fruit industry, consisting of a top roller press, forcing the fruit into a meat grinder chamber which in turn continuously forces the mass through suitable size openings in an outer die where they are appropriately cut by revolving cutting knives attached to the worm shaft, or otherwise tightly fitting the die. Simultaneously, a suitable flour, preferably rice flour, is blown on the face of the die thoroughly surrounding the fruit as it protrudes, and is thereafter shaken off or removed by common shaker method.

As an example of what we mean by "comminuted fruit particles" and a preferred method of manufacture:

We mill or otherwise finely grind a dried fruit such as white figs, 110 pounds, and into which we mix by use of a common bakery mixer 60 pounds of sugar, 30 pounds of pure cherry jam, and 25 pounds of preferable coconut fibre with a major portion of its oil and flavor removed. We add salt, flavor and U. S. P. color to suit, and mix into a homogeneous mass. The ground figs in the above example may be replaced by the fig product disclosed and claimed in Patent No. 2,157,485, issued May 9, 1939, to John Hood Forkner.

The resulting homogeneous mixture can be employed to form pellets of the character usually employed in the bakery trade as explained above. However, we prefer to process the mixture to provide particles or pellets of an unusual and desirable character.

The further processing usually comprises forming suitable shapes for drying such as small sheets, strips or balls, say of a thickness of from about 1/8" to 5/8" depending upon the final particle size desired. The shapes are placed in a dryer and the moisture removed to provide a brittle condition. Usually a brittle condition is obtained with a moisture content of from about 5 to 10%.

The brittle shapes are then fed to a hammer miller set in accordance with the desired particle size in the usual manner. The impacting action of the hammer mill serves to break or crack the shapes into irregular particles or pellets which are characterized by the smooth even character of the surfaces and by the sharp defined edges of the particles. From the hammer mill the particles may be graded as to size, for example, by a shaker screen. An undesired particle size may be reprocessed as described above.

The finished particles are of odd size which, when dispersed in a bakery product and after baking, will not ferment, will not appreciably lose their bright primal colors, will not streak when cut, will not crack nor easily pull out from their dough base. The particles do not agglomerate and will retain their individual character for an indefinite period when properly packed, i. e., in a glass container or a waxed paper.

The above described process can be modified to produce a fruit powder or semi-powdered material to replace fruit pastes such as fig paste which is supplied to bakers in bulk form to use in fig bars. For example, suitable proportions of ground dried white figs, sugars and ground coconut fibre can be mixed and processed as described above. In the processing the preferred hammer mill action employed is controlled to produce small comminuted particles forming a finely divided material or semi-powder, which is hygroscopic and yet substantially free flowing.

Heretofore to commercially dehydrate dried fruit to a brittle consistency without deleterious physical and chemical changes such as caramelization of the sugar, change of the flavor, and modification of the cellular structure, it has been necessary to dry under reduced pressure. We have found that when nut fibre is added in sufficient amounts to the dried fruit it can be readily dehydrated to a brittle consistency at atmospheric pressure. Because this brittle state is reached at a higher moisture content when nut fibre is incorporated in the fruit, it lessens the risk of burning and greatly decreases the drying time which have previously been essential factors prohibiting the commercial drying of fruit to a brittleness without resorting to vacuum.

Throughout the above described process the coconut lessens the natural stickiness of the dried fruit when warm, it maintains a firm base under the heat formed by the expressing action of the pellet machine and the hammering of the hammer mill. In the former machine, it helps prevent the fruit from gumming up on the cutting knives and in the latter unit it keeps the fruit from balling up in a gummy mass and adhering to the breaking knives and/or filling up the screen holes.

The stabilizer of the instant invention, because of its cellular, non-viscous consistency, provides this fruit base with the essential characteristics necessary for this process of production. It keeps the fruit firm while it is traveling through the grinder chamber and does not allow it to break down excessively under the heat therein generated as occurs with natural dried fruits. Further, the fruit and fibre paste does not gum up on the outer face of the die and the cutting knives while in the process of being cut. As it is not very sticky, the small particles do not tend to stick together, and the firm body provides a suitable cutting base and it thereafter retains its shape. The lack of free moisture which the nut fibre checks prevents excessive wetting of the flour or starch which is blown on the fruit as it protrudes from the die. The fibre keeps the pellets firm so that they do not stick together during or after cutting or later when ultimately packed. This is in contrast to certain natural fruits and jams (particularly if fortified with sugar) which break down excessively due to the heat in the grinder chamber and will not cut or retain individual shapes. Many fruits are naturally so soft that they present free moisture and tend to liquefy when they protrude from the cutting die so that the knives produce a gummy mass preventing suitable pellet production.

Paste made in accordance with the above suggestion may be employed in or between layers of dough as in filled cookies, and as fillings and toppings for cakes and pastries. By controlling the sugars, color and flavor added, combinations of fruit paste having our fibrous carrier may be made to resemble any selected fruit product, such as cherry or orange products.

In filled cookies, such as fig bars, it is desirable in many instances to incorporate as much sugar and syrup and moisture in proportion to the fruit as it is possible. In this instance the fruit and coconut fibre act as a carrying vehicle for the other ingredients.

Heretofore, the amount of water and sugar that could be added to the fruit vehicle has been limited by the following factors:

(a) If too much water was added it soaked into and spoiled the dough during and after baking and tended to break down while the product was being cut. Cookies stuck together when packed and ran at the ends.

(b) If the carrying vehicle was an extremely hygroscopic fruit, such as raisins, the filler tended to absorb an excessive quantity of moisture from the atmosphere in areas of high humidity. This moisture was absorbed from the filler by the dough, causing spoilage. This difficulty has made raisins and many other fruits generally undesirable for this type of bakery product.

(c) If too much sugar or syrup was added to the fruit filler it caused the filler to liquefy and to expand during baking and while hot. After baking the dough cools relatively quickly and sets hard. The filler cools much more slowly and when cold the fruit and sugar tend to contract from its dough jacket, leaving observable air pockets which later cause cracking and breaking in the dough jacket.

For the above reasons, heretofore it has not been commercially possible to manufacture filled fruit cookies exceeding about an equal part of sugar to a part of fruit and the total of the water content approximating 25%. By our process of incorporating in the filler about 15% nut fibre, prepared as herein indicated, we may increase both the moisture and sugar content without the above enumerated difficulties, because the comminuted fibre carries the water in finely divided particles and prevents excessive accumulation in small areas causing dough spoilage.

We find we can add in addition to its normal moisture content of the fruit paste at least a weight of water equal to that of the fibre and wherein the sugar content is sufficient to prevent fermentation.

Further, the fibre tends to set the filler at its highest point of expansion during baking. Thereafter the lack of contraction minimizes air pockets and further jacket cracking difficulties, providing a filling of high sugar and/or moisture content that fills snugly its dough jacket. Also the fibre tends to hold the moisture in the filling and to prevent rapid absorption of the dough. This remedy is effective either where excessive moisture is implanted during mixing or if the fruit absorbs moisture from the atmosphere at a later date.

An illustrative practical filled cookie formula with our stabilizer is as follows:

| | Pounds |
|---|---|
| Fig jam | 100 |
| Raisin jam | 100 |
| Sugar | 200 |
| Invert syrup of proper consistency | 100 |
| Coconut stabilizer | 60 |
| Water if necessary | |
| Total | 560 |

A further attribute of our fibre prepared as herein specified is that it can be made in a very white form. Recognizing that its volume per unit weight is two or more times that of dried fruit, a relatively small percent of fibre will yield a high apparent volume. Because of the aforesaid mentioned combined whiteness and volume, this carrying vehicle imparts a whitening action to its accompanying agent, particularly when used in conjunction with the buff brown of white figs, or the darkness of black figs or prunes. Of course, a similar action occurs with other dried fruit. Further, for the same reasons as above indicated the fibre provides a superior primal color base for such colors as green, yellow or red.

From the above description, it will be recognized that we have provided a manufactured fruit product which provides a number of new and advantageous characteristics not inherent in natural fruits. The stabilizer has a much greater volume for a given weight than natural fruit, so that a small per cent of the carrier by weight provides a large volume for carrying capacity. The stabilizer has a moisture-absorbing capacity of at least its own weight while sustaining the essential characteristics of dryness. The stabilizer's moisture-absorbing capacity is present at all normal and baking temperatures and will expand by the absorption of escaping steam and moisture from the surrounding dough in cooking and will not contract upon cooling. In this way it can be used in dough products without causing air pockets in the surrounding dough. The expansion of this fruit product is uniform, eliminating cracking. Further, the density of the mixture of the fruit and the stabilizer is substantially similar to that of the surrounding baked dough. The coconut fibre inhibits and lessens the naturally viscous nature of many dried fruits and fruit jams. For example, the bakery item, in spite of the fruit pellets therein, can be sliced evenly and without streaking and sticking to the knife. It has been found also that the stabilizer and fruit mixture upon cooling will retain the absorbed mixture so that uniform and proper baking of the dough immediately around the pellets is insured. The mixture of the fruit and stabilizer may be such that the presence of the coconut is not obviously detectable by inspection, so that bakery items containing the product present the appearance of the selected fruit to the consumer. We may use the fibre of various nuts including the several nuts above enumerated either separately or in combination.

It will be recognized that the moisture absorption and retention capacity of our desired fibre is substantially greater than that of nut meats containing all or a major portion of their oil such as desiccated coconut. Our desired fibre permits actual permeation of the water into its cells in the intimate manner previously enjoyed by the oil. Such a permeation obviously can not occur where the natural oil is still present in the meat. Thus in fruit our fibre will retain an appreciable weight of moisture for a much longer period than desiccated coconut will retain an equal weight of moisture.

Heretofore, only dried fruits of high sugar content have been completely successful for baked goods wherein it has been desired to keep the resultant product beyond the period when fermentation sets in. Bakers have complained that dried fruits do not bake out which is particularly true of the low sugar content group of prunes and applies. Further, the baking process infuses them with an excess of moisture that causes fermentation. When attempts have been made to grind the fruit fine and add sugar to it, the resultant product has baked out in a mushy manner that is very undesirable. Our process allows us to finely mill such dried fruits and add sugar in conjunction with our nut fibre and to comminute as herein described in such a manner that when dispersed with dough the particles do not break down, become mushy, nor ferment, and they appear to be "baked out."

The expressions "intimate mixture" and "intimately mixed" as used in the following claims are intended to mean that the stabilizer component is substantially uniformly dispersed in the fruit component of the mixture so that the said components give the appearance of a homogeneity.

We claim:

1. Finely divided fruit product particles comprising, an intimate mixture of a dried fruit and a minor proportion of a stabilizer comprising fibrous nut meat having a major portion of its oil removed.

2. Fruit product pellets of odd shapes having smooth surfaces and sharply defined edges, the said pellets comprising an intimate mixture of particles of dried fruit and a minor proportion of a stabilizer comprising ground fibrous nut meat having a major portion of its oil removed.

3. Finely divided fruit product particles comprising, an intimate mixture of dried figs and a minor proportion of a stabilizer comprising fibrous nut meat having a major portion of its oil removed.

4. Fruit product pellets of odd shapes having smooth surfaces and sharply defined edges, the said pellets comprising an intimate mixture of particles of dried fruit and a major proportion of a stabilizer comprising ground fibrous coconut meat having a major portion of its oil removed.

5. Finely divided fruit product particles comprising, an intimate mixture of dried fruit and a minor proportion of a stabilizer comprising fibrous coconut meat having a major portion of its oil removed.

6. The method of making finely divided fruit product particles which comprises, grinding fibrous nut meat having a major portion of its oil removed to produce a fruit stabilizer, grinding a fruit to form a paste, intimately mixing a minor proportion of the ground stabilizer and fruit paste, drying the paste mixture, and milling the dried paste mixture to produce finely divided particles.

7. The method of making fruit product pellets which comprises, grinding fibrous nut meat having a major portion of its oil removed to produce a fruit stabilizer, grinding a fruit, intimately mixing a minor proportion of the ground stabilizer and ground fruit, drying the mixture to provide solid forms, and cracking the solid forms to produce pellets of odd shapes having smooth surfaces and sharply defined edges.

8. The method of making finely divided fruit product particles which comprises, grinding fibrous coconut meat having a major portion of its oil removed to produce a fruit stabilizer, grinding a fruit to form a paste, intimately mixing a minor proportion of the ground stabilizer and fruit paste, drying the paste mixture, and milling the dried paste mixture to produce finely divided particles.

9. The method of making fruit product pellets which comprises, grinding fibrous coconut meat having a major portion of its oil removed to produce a fruit stabilizer, grinding a fruit, intimately mixing a minor proportion of the ground stabilizer and ground fruit, drying the mixture to provide solid forms, and cracking the solid forms to produce pellets of odd shapes having smooth surfaces and sharply defined edges.

10. A food product comprising a fruit ingredient baked in dough, the said fruit ingredient being in the form of pellets of odd shapes having smooth surfaces and sharply defined edges, and the said pellets comprising an intimate mixture of particles of dried fruit and a minor proportion of a stabilizer comprising ground fibrous nut meat having a major portion of its oil removed.

11. A bakery product containing a fruit filler baked in the dough, the said filler comprising finely divided fruit product particles, the said fruit product comprising an intimate mixture of a dried fruit and a minor proportion of a stabilizer comprising ground fibrous nut meat having a major portion of its oil removed.

12. A fig bar comprising a fig filler baked in dough, said fig filler comprising an intimate mixture of ground fig, sugar and water, and a minor proportion of a stabilizer comprising ground fibrous nut meat having a major portion of its oil removed, any excess moisture in the filler being absorbed by the stabilizer.

13. A food product comprising a fruit ingredient baked in dough, the said fruit ingredient being in the form of pellets of odd shapes having smooth surfaces and sharply defined edges, and the said pellets comprising an intimate mixture of particles of dried fruit and a minor proportion of a stabilizer comprising ground coconut meat having a major portion of its oil removed.

14. A baker product containing a fruit filler baked in the dough, the said filler comprising finely divided fruit product particles, the said fruit product comprising an intimate mixture of a dried fruit and a minor proportion of a stabilizer comprising ground coconut meat having a major portion of its oil removed.

15. A fig bar comprising a fig filler baked in dough, said fig filler comprising an intimate mixture of ground fig, sugar and water, and a minor proportion of a stabilizer comprising ground coconut meat having a major portion of its oil removed, any excess moisture in the filler being absorbed by the stabilizer.

16. The method of making a bakery product having a fruit ingredient, which comprises providing a fruit ingredient in the form of pellets of odd shapes having smooth surfaces and sharply defined edges and comprising an intimate mixture of particles of dried fruit and a minor proportion of a stabilizer comprising ground fibrous nut meat having a major portion of its oil removed, adding said pellets to a body of dough and then baking the dough and added pellets.

17. The method of making a bakery product containing a filler, which comprises providing finely divided fruit product particles comprising an intimate mixture of dried fruit and a minor proportion of a stabilizer comprising ground fibrous nut meat having a major portion of its oil removed, embodying said filler in a mass of dough, and baking the dough.

18. The method of making fig bars which comprises, providing a fig filler comprising an intimate mixture of dried fig, sugar and water, and a minor proportion of a stabilizer comprising ground fibrous coconut meat having a major portion of its oil removed, embodying the resulting filler mixture in dough and baking the dough with the embodied filler, the said stabilizer absorbing any excess moisture in the filler mixture.

19. The method of preventing agglomeration of substantially dried fruit particles, which comprises intimately mixing with the fruit particles ground fibrous nut meat having a major portion of its oil removed, the said fibrous nut meat having the capacity to absorb additional moisture.

JESSE CLAYTON FORKNER.
JOHN H. FORKNER.